United States Patent [19]

Tracksdorf

[11] Patent Number: 4,865,268
[45] Date of Patent: Sep. 12, 1989

[54] JET ENGINE NACELLE

[75] Inventor: Peter Tracksdorf, Gröbenzell, Fed. Rep. of Germany

[73] Assignee: MTU Motoren - Und Turbinen-Union Muenchen, Munich, Fed. Rep. of Germany

[21] Appl. No.: 209,193

[22] Filed: Jun. 20, 1988

[30] Foreign Application Priority Data

Jun. 19, 1987 [DE] Fed. Rep. of Germany ....... 3720318

[51] Int. Cl.[4] .......................... B64D 33/02; F02C 7/04
[52] U.S. Cl. .................................... 244/53 B; 137/15.2
[58] Field of Search ..................... 244/53 B; 137/15.1, 137/15.2

[56] References Cited

U.S. PATENT DOCUMENTS

| | | | |
|---|---|---|---|
| 2,699,906 | 1/1955 | Lee et al. | 244/53 B |
| 3,222,863 | 12/1965 | Klees et al. | 244/53 B |
| 3,446,223 | 5/1969 | Hancock | 244/53 B |
| 3,664,612 | 5/1972 | Skidmore et al. | 244/53 B |
| 3,915,413 | 10/1975 | Sargisson | 244/53 B |
| 4,025,008 | 5/1977 | Peikert | 244/53 B |
| 4,474,344 | 10/1984 | Bennett | 244/53 B |

*Primary Examiner*—Galen L. Barefoot
*Attorney, Agent, or Firm*—Barnes & Thornburg

[57] ABSTRACT

A construction is provided to aerodynamically affect a jet engine nacelle in its intake lip area primarily by forming and pivotally arranging flaps on a radially outer circumferential sector of the intake lip such that from a first extreme position, in which they are adapted to a cruise lip geometry, they can be moved into a second extreme position, in which they radially expand the outer contour of the intake lip while providing and exposing air blowoff ducts with their rear side, said ducts terminating at the outer wall of the nacelle at essentially a tangent therewith. Further air injection flaps are also provided in certain embodiments for forming air injection ducts through the intake lip walls during certain engine operating conditions.

32 Claims, 8 Drawing Sheets

JET ENGINE NACELLE

BACKGROUND AND SUMMARY OF THE INVENTION

This invention relates to a jet engine nacelle which is aerodynamically influenced in its entry lip area by flaps.

Modern gas turbine jet engines for use in long- but also short- and/or medium-haul aircraft primarily are constructed in the form of turbofan or ducted-fan engines of multi-spool construction, where the predominant portion of propulsion is provided by front or aft fans or compressors. With these engine types a free power turbine downstream of the compressor turbine of the gas generator (inner or first engine cycle) is often used to drive the fan sustaining the outer or second engine cycle.

These engines are installed in nacelles which form a so-called annular "intake lip" at the leading end. With a view to sustained or cruise flight operation, which for the type of aircraft exemplified above is the most commonly used mode, it is generally attempted to attune the geometry of the intake lip to sustained or cruise flight conditions for minimum aerodynamic losses with respect to ambient and intake air flows. Further, in the interest of a relatively small engine diameter, e.g., it is attempted to keep the intake lip area relatively slim and optimal from the consumption aspect.

While this geometrical design of the intake lip may be advantageous from the sustained or cruise-flight aspect, it completely ignores two crucial cases. A first crucial case is when an aircraft is in a take-off phase in which the aircraft is directly about to lift off the take-off strip and the load on the engine is relatively severe and the air and gas mass flows through the engine are high. At this time, the aircraft is inclined at a considerable local angle of attack with the take-off strip relative to the ambient air flow and a risk exists of notable flow separation of intake air portions on the radially inner wall area of part of the lower intake lip. Thus, irregularities of the flow at the engine inlet and indifferent vibration and flutter tendencies may be caused on the blower or fan blades, and even the risk of gas generator compressor surge cannot be excluded from consideration as long as the separation region propagates far enough towards the gas generator (compressor).

The second crucial case is that of possible failure of a jet engine on, e.g., a twin-engine aircraft, when the aircraft is inclined at a relatively steep angle with respect to a horizontal plane and when an only remaining, extremely low airflow through the engine may cause autorotation (windmilling) of the engine, a condition that is separate from the normal aero-thermodynamic cycle. In this second flight case, a risk exists of relatively pronounced flow separations of the air on the outer wall of the intake lip and over a radially outer circumferential sector of the latter. Engine failure of this type is considered critical especially with twin-engine aircraft, for the reason that the grave flow separations in the lip region of the nacelle outer contour make it impossible to maintain the prescribed gradient of climb.

In order to prevent said first grave case and its consequences from developing, air injection flaps in the form of so-called blow-in doors had previously been proposed that were to permit a locally variable intake lip geometry designed such that the desired local fineness ratio of the intake lip was ensured during cruise, while on the other hand, the flow separations forming radially inward on the lower portion of the intake lip were eliminated by air injection effected from the outside to the inside into the intake air flow.

Said air injection measures, however, contribute nothing towards solution of the problems associated with the second crucial case (failure of one engine). Fixed radially outer expansion of the lip structure on the nacelle outer side, which might conceivably be used to cover this relatively rare flight condition, would not only be associated with a nacelle weight penalty, but also with an enlarged air-wetted surface area of the blower cowling formed by the nacelle, aggravating the friction and form drag of the nacelle; and all of these consequences harmonize little with a nacelle fineness ratio that has been aerodynamically optimized for sustained or cruise flight.

In a broad aspect of the present invention, a nacelle of the initially cited generic category is provided which eliminates the suction peaks and flow separations occurring especially with a view to engine failure on an upper circumferential sector of the intake lip, on the outside, and which makes it possible to achieve a suitably slim geometry of the nacelle intake lip to meet cruise or sustained flight requirements.

In especially preferred embodiments of the present invention, the above-noted objects are achieved by providing flaps on a radially outer circumferential sector of the entry lip, which flaps are movable between a cruise flight position in conformance with the contours of the nacelle and an extreme position in which they externally expand the entry lip radially and simultaneously provide exposed blow-off ducts extending essentially tangentially to the outer wall of the nacelle.

In accordance with preferred embodiments of the present invention, the lip outer contour can be expanded radially outward in flap-like fashion to the geometric extent desired exclusively for said critical case (engine failure/windmilling), without having to expect an appreciable amount of overflow of the airstream forming on the leading edge of the intake lip that would cause said suction peaks and flow separations.

The blow-off ducts formed in connection with a second extreme position of the flaps prevent a stagnation zone of the air stream from forming downstream of the respective outermost flap extension (outer flap), so that this arrangement on balance provides a rather low-drag blow-off configuration.

The solution according to the invention also eliminates the need of continuing with a fixedly arranged local expansion of the wall on the radially outer side of the intake lip also in cruise or sustained flight operation. This facilitates lower weight of the nacelle, and it considerably reduces the aerodynamic drag of the nacelle for improved economy of the aircraft.

In accordance with especially preferred embodiments of the invention, inner and outer flaps are arranged for automatic pivotal movement to permit air blow-off in response to the differential pressure between the static pressure on the outside and the static pressure on the inside of the lip area affected. Arrangements are also contemplated utilizing a suitably combined arrangement of air injection flaps to optimize the utilization of the available space at the nacelle. In especially preferred embodiments, a generally aerodynamically optimized, slim engine nacelle of low aerodynamic frontal drag (cruise flight) is obtained while providing solutions in said two, initially cited crucial conditions.

Other objects, advantages and novel features of the present invention will become apparent from the following detailed description of the invention when considered in conjunction with the accompanying drawings.

DETAILED DESCRIPTION OF THE DRAWINGS

A primary object of the present invention is to safely control an initially mentioned critical case of the aircraft plus jet engines and their nacelles 1 being in a flight phase characterized by engine failure (windmilling) (FIG. 1), so that as a consequence the airflow through the engine is extremely low. In this configuration, the relatively steep aircraft angle of attack $\alpha$ is here represented by the angle included between the engine/nacelle centerline "A" and a schematically implied horizontal plane "E". The hub 2 of a blower or fan is at the forward end of the engine. With a view to the present angle of attack $\alpha$, the streamlines S, S1 indicate the ambient air flow, the streamlines S3, S4 indicate the progress of the relatively small airstream still captured at least in part by the nacelle intake, and the progress of streams S5, S6 indicates the residual air stream of the captured air stream portion that still enters the engine directly, all with reference to the extremely low airflow at engine failure (windmilling).

In this phase, a partial airstream "F" escapes to the outside from a stagnation region "St" forming alongside the frontal upper zone ahead of the intake lip 3, and forms relatively pronounced turbulences F2 opposite the frontal edge and downstream surface areas of the intake lip 3 (outer side); so that pronounced local flow separations result. This deficiency could be relieved using an outer wall expansion, zone 3' shown in broken-line in FIG. 2, of the intake lip 3, i.e., by a fixed expansion that is integral with the wall and is expected to produce a flow F' maximally free from separation.

Increased weight and surface drag would then result, especially also with a view to the most common, cruise or sustained flight mode of operation.

Figure 5:
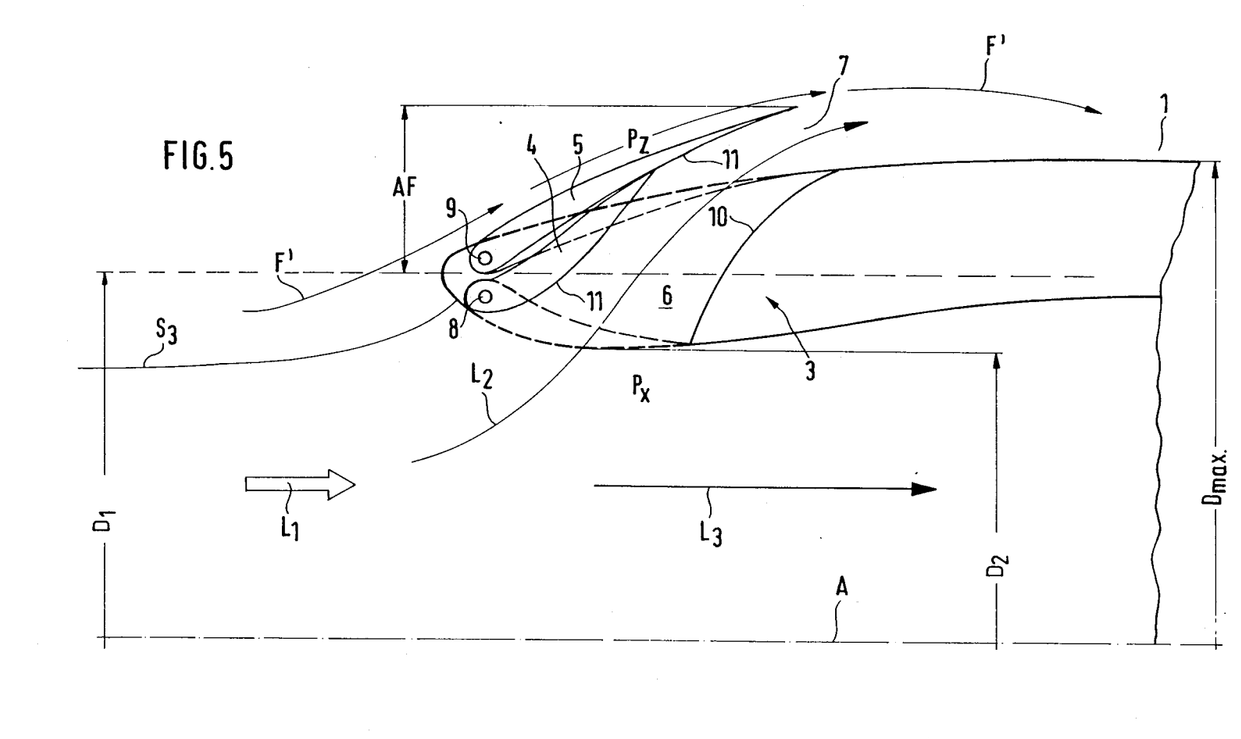
FIG. 5 is a radial section of an upper portion of the intake lip of an engine nacelle, with measures taken as schematically indicated in FIG. 2, showing outer and inner flaps in a first extreme position (profile blocking) and in a second extreme position (radially outer profile expansion and simultaneous exposure of a blow-off duct at the rear end of the flaps constructed in accordance with a preferred embodiment of the invention)
Figure 8:
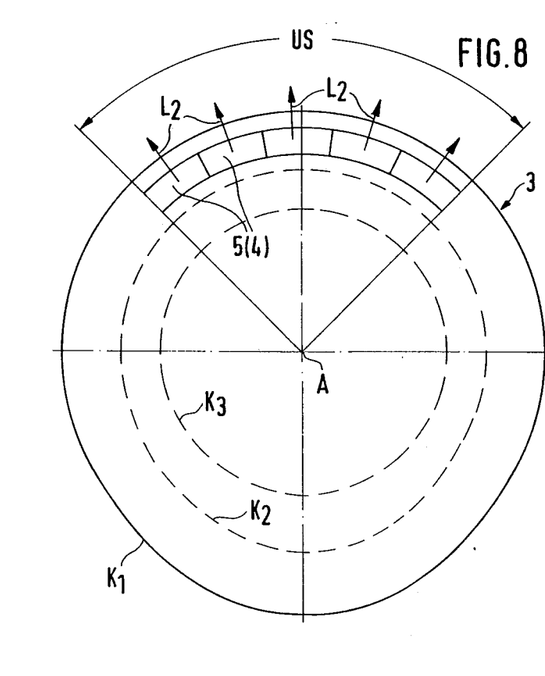
FIG. 8 is a frontal view of an intake lip configuration of an engine nacelle illustrating a reduction in intake lip thickness that can be achieved over the arrangement of FIG. 7 with inner and outer flaps disposed in accordance with FIG. 5 and spaced continuously over an upper circumferential sector in accordance with a preferred embodiment of the invention.

In order to safely contain the problem, the present invention first provides a variable lip inlet geometry as shown in FIGS. 5 and 8. Inner and outer flaps 4, 5 are arranged for pivotal movement on a radially outer circumferential sector of the intake lip 3, such that from a first extreme position in which they are adapted to suit a lip geometry for cruise flight (shown in broken line in FIG. 5), they can be moved into a second extreme position in which they radially expand the intake lip 3 on its outside (expansion AF), while simultaneously providing and exposing air blow-off ducts 6 with their rear side. Ducts 6 terminate with their slot-shaped exit ports 7 at the outer wall of the nacelle 1 and essentially at a tangent therewith.

Of the airstream L1 bounded by the "outer" streamline S3, and captured by the intake lip 3, therefore, a partial stream L2 exits into the ambient airflow on the outside of the nacelle wall through the respective blow-off duct 6 and exit port 7. In this manner, no wake zone is allowed to form downstream of the exit port 7 or downstream of the free end of the outer flap 5. As illustrated also in FIG. 2, therefore, the flow F' around the flap-like, aerodynamically "artificially" expanded outer geometry of the intake lip 3 (FIG. 5) is continuously free from separation in said critical case (engine failure). The major portion of the captured airstream L1 is directed to the engine (direction of arrow L3).

As it is also shown in FIG. 5, the respective outer and inner flaps 5, 4 can be made to pivotally adjust in response to the pressure difference prevailing between the static pressure (PZ) on the outside and the static pressure (PX) on the inside of the respective lip area. The inner and outer flaps 4 and 5 are spring-loaded and will open only at a relatively large pressure difference PX-PZ corresponding to the windmilling case (engine failure) or the flight idle case.

In a further aspect of the present invention, the inner and outer flaps 4, 5 can be suspended from torsion rods 8, 9 for automatic opening or closing movement.

As it will also become apparent from FIG. 5, the free ends of the inner and outer flaps 4, 5 can be arranged for movement relative to a stationary rear wall 10 of the air blowoff duct 6, said rear wall extending with respect to the common engine/nacelle centerline A in an inclined or curved path from a point on the lower forward end to a point on the rear upper end.

In exact characterization of the arrangement of FIG. 5, therefore, one pair each of inner and outer flaps 4, 5 is arranged on the front end of the lip for joint pivotal movement, said pair of flaps being deployed in a first extreme position with free flap ends blocking the entry lip 3 at the respective outer and inner ends of the rear wall 10, being flush with the wall (dashline showing of FIG. 5) the flaps 4, 5 are collapsed in a second extreme position, to form the front wall 11 of the exposed air blowoff duct 6 and with the outer flap 5, the radial expansion AF (solid line showing of FIG. 5).

As it is also shown in FIG. 5, the inner and outer flaps 4, 5 each exhibit bilaterally differently curved wall sections to serve different functions.

The forward wall 11 of an air blowoff duct 6, formed by a pair of inner and outer flaps 4, 5 in a collapsed first extreme position, can be inclined or curved in approximate adaption to the rear wall 10, more particularly in combination with the inclination of the rear wall 10 such that the air blowoff duct 6 tapers continuously in the direction of flow L2.

FIG. 8 shows an arrangement in which the inner and outer flaps 4, 5 are here illustrated as spaced in pairs and directly adjacent to each other over an outer circumferential sector US of the intake lip 3. As in FIG. 5, the respective blowoff airstream is indicated by L2 also in FIG. 8.

Figure 7:
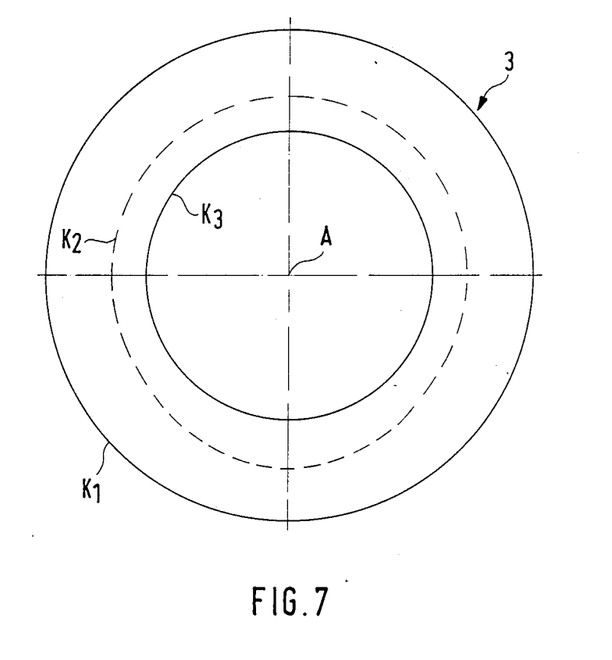
FIG. 7 is a frontal view of an intake lip configuration of an engine nacelle, with no use whatsoever being made of flap-like blow-off and/or injection arrangements.
Figure 9:
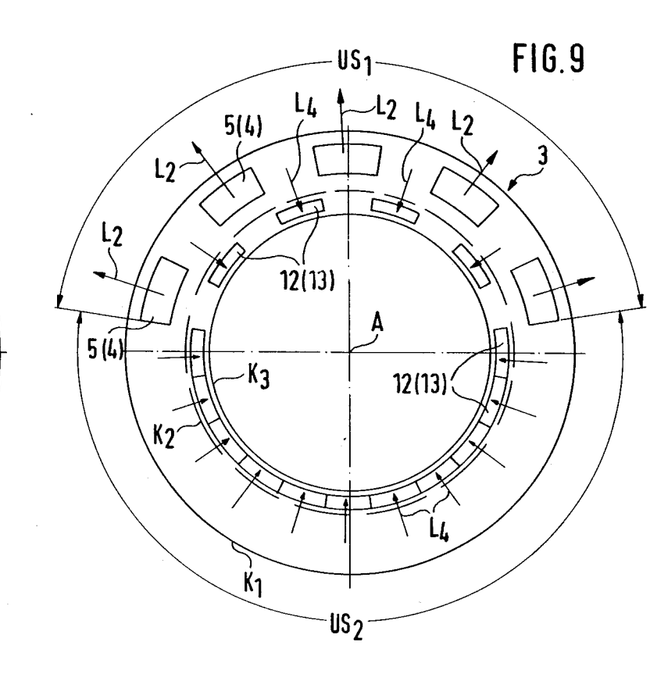
FIG. 9 is a frontal view of an intake lip configuration of an engine nacelle illustrating a considerably reduced thickness of the intake lip over its entire circumference, when compared with FIG. 8, with a combination of inner and outer flaps in accordance with FIGS. 5 and 6 in accordance with another preferred embodiment of the invention.

In FIGS. 7, 8 and 9, "K1" indicates the outer contour corresponding to the maximum outer diameter Dmax of the intake lip 3; "K2" indicates the lip leading edge corresponding to the leading edge diameter D1, and "K3" indicates the contour with a view to the throat area in accordance with D2.

Unlike the arrangement in FIG. 7, therefore, the variable intake geometry of FIGS. 5 and 8 produces a contour geometry of the intake lip 3 that follows the contour K1, K3, and that continuously decreases in wall thickness from a radially low point to a radially high point when viewed with respect to the longitudinal centerline A.

The intake lip 3 characterized in accordance with FIG. 7 by the relatively thick-walled contour K1, K3, based on the following considerations.

Figure 1:
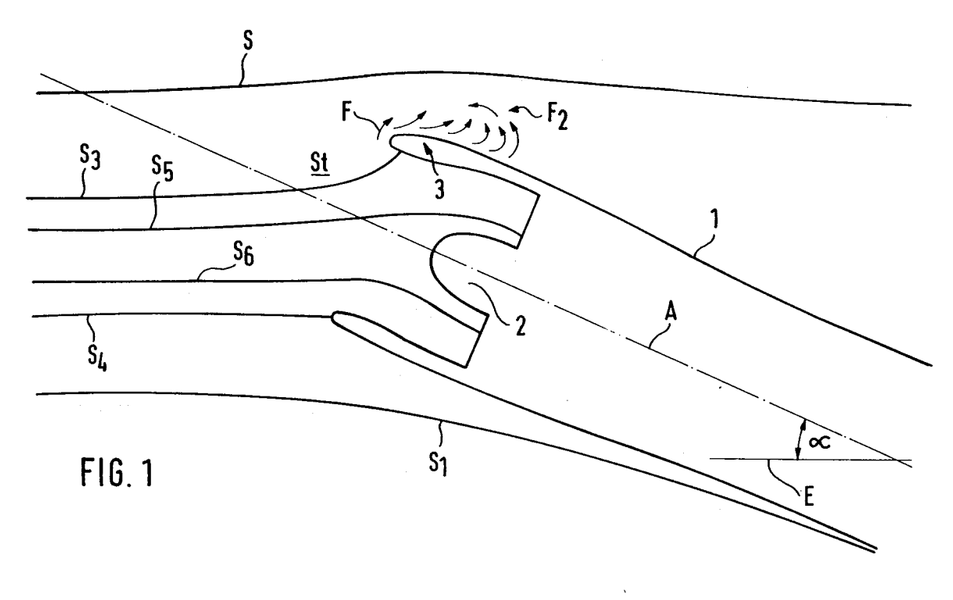
FIG. 1 is a streamline sketch illustrating the aerodynamic impact at a jet engine nacelle in the event of engine failure (windmilling) with no measures being taken especially with respect to local flow separations on the upper section of the intake lip outer side.
Figure 2:
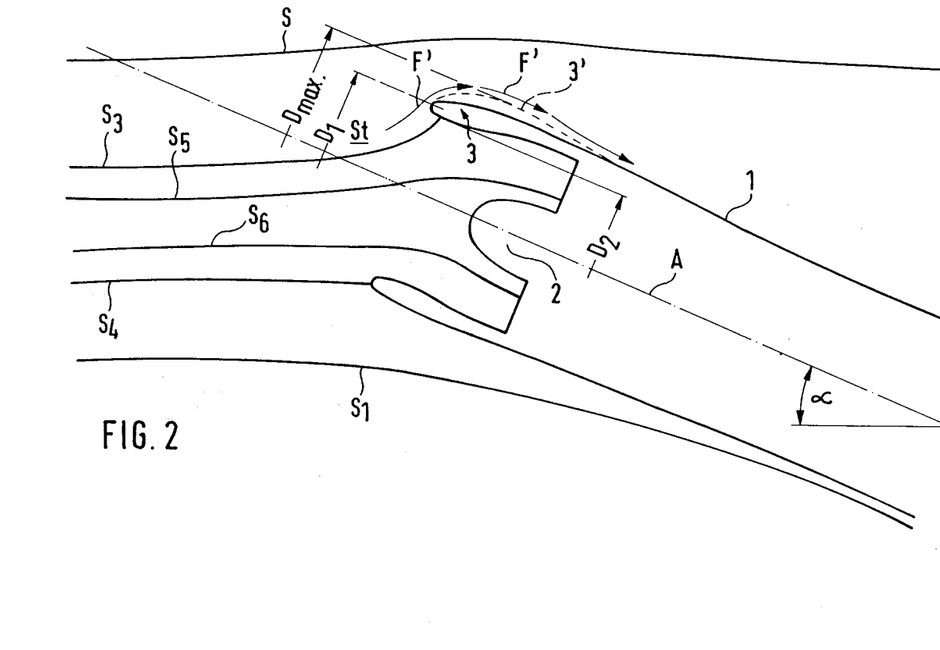
FIG. 2 is a second streamline sketch illustrating the aerodynamic impact in the event of engine failure (windmilling), but with measures (expansion) taken especially to prevent local flow separations on the upper section of the intake lip outer side in accordance with preferred embodiments of the present invention.

To accomodate the conditions depicted in FIG. 2 (engine failure, windmilling), enlargement of the maximum diameter Dmax in the upper portion of the shrouding (zone 3') is required to prevent flow separations (eddies F2 in FIG. 1).

Figure 3:
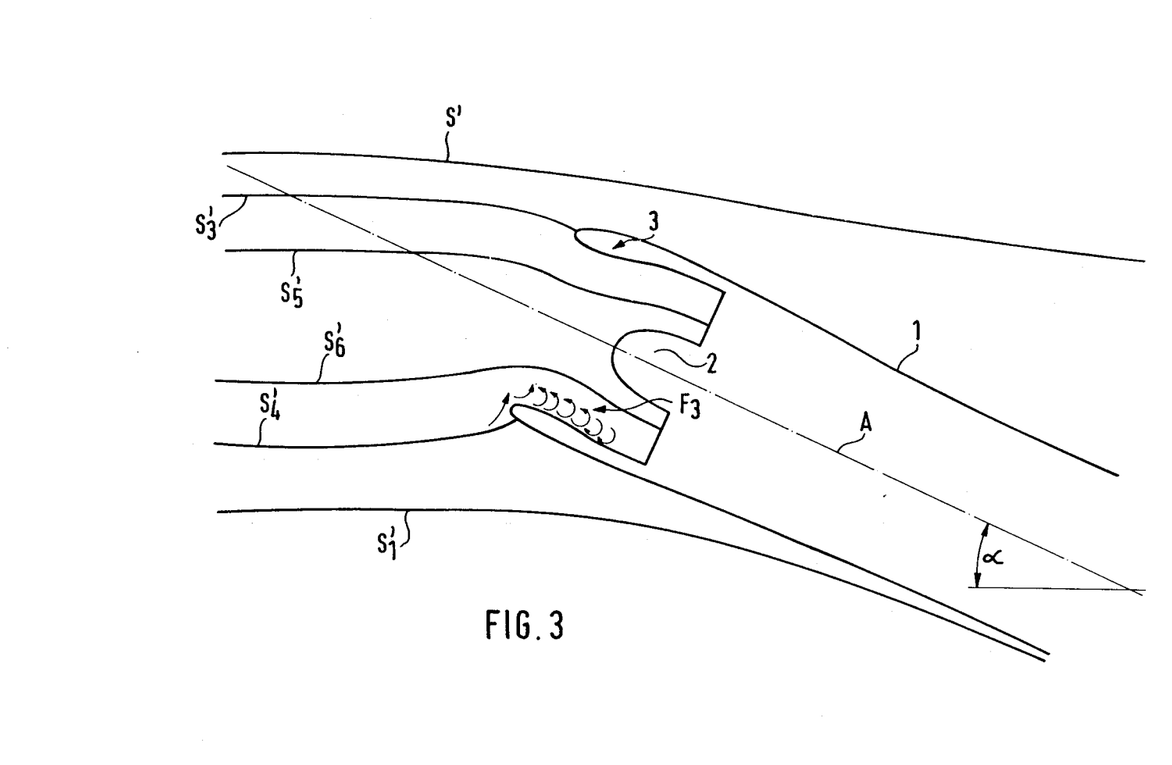
FIG. 3 is a third streamline sketch illustrating the aerodynamic impact with respect to the engine in a phase in which the aircraft is in its take-off rotation immediately before lifting off the take-off strip, with no measures taken with respect especially to local flow separations on the lower section of the intake lip inner side.
Figure 4:
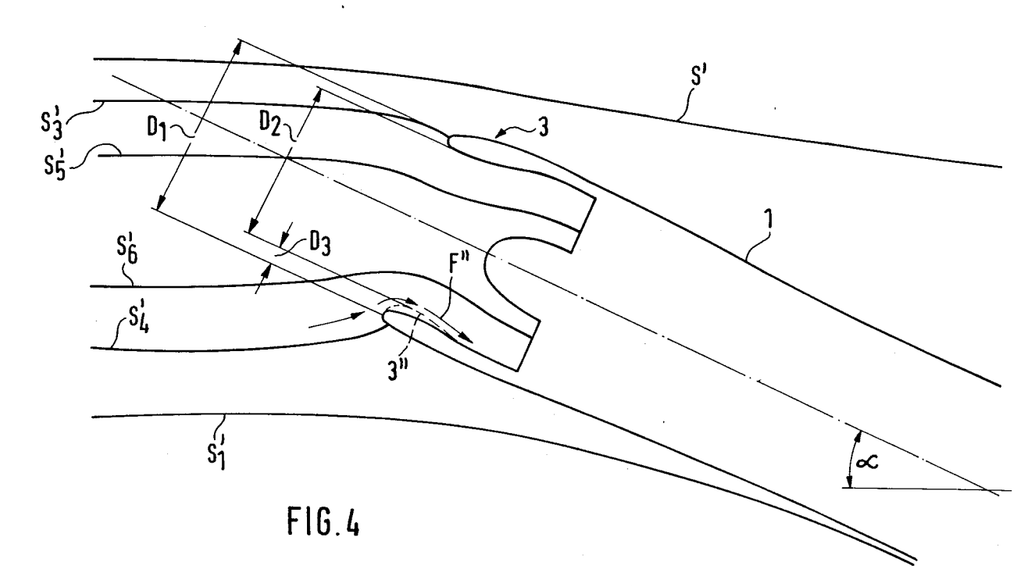
FIG. 4 is a fourth streamline sketch illustrating the aerodynamic impact basically in accordance with FIG. 3, except that here measures are taken (expansion) to prevent local flow separations on the lower section of the intake lip inner side in accordance with preferred embodiments of the present invention.

To facilitate the conditions depicted in FIG. 4 (initially mentioned first crucial take-off case [rotation in take-off phase]), an additional radial expansion D3 in accordance with zone 3' must be incorporated relative to the leading edge diameter D1 in the lower-most part of the shrouding or intake lip 3 to prevent turbulent flow (eddies F3 in FIG. 3), and ensure non-separating flow F'on the inside of the intake lip 3 (FIG. 4). These measures of FIGS. 2 and 4 will, in combination, produce the intake geometry in accordance with FIG. 7, which has a relatively large maximum diameter Dmax in accordance with contour K1, and involves a relatively large weight penalty plus considerable friction and form drag of the nacelle 1.

In connection with FIGS. 3 and 4, it should be remembered that the streamlines shown in these figures should be understood in relation to the operating condition shown in the figures (rotation in take-off phase), and that in analogy to the nomenclature in FIGS. 1 and 2, they are indicated by S', S1', S3', etc.

FIG. 9 illustrates an embodiment of the present invention with inner and outer flaps 4 and 5 (blowoff, solution to problem in accordance with FIGS. 1 and 2) in combination with air injection flaps 12, 13 in pair-by-pair arrangement for pivotal movement (solution of problem in accordance with FIGS. 3 and 4).

Figure 6:
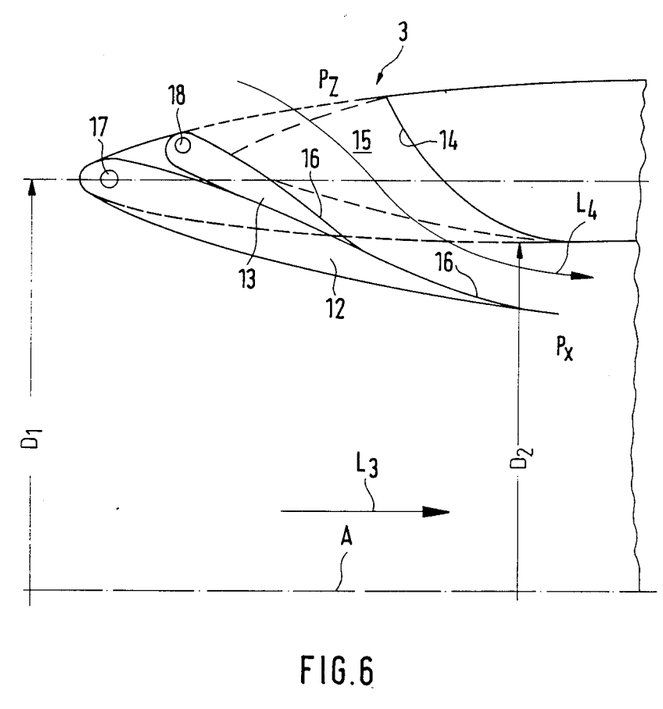
FIG. 6 is a deviating radial section of an upper portion of the nacelle intake lip, where for profile blocking (first extreme position), suitable inner and outer flaps are moved against the intake air flow as air injection flaps, with the intake lip expanded radially inward, where an air injection duct issuing into the intake air flow is exposed at the rear end of the flaps constructed according to another preferred embodiment of the invention.

FIG. 6 illustrates a pair of such air injection flaps 12, 13 which, with reference to FIG. 9, is arranged on a radially upper portion of the intake lip 3 (circumferential sector US1).

In accordance with FIG. 6, therefore, the air injection flaps 12, 13 can be comprised of a pair each of double flaps of different lengths, which pair is arranged on the front side for pivotal movement such that in a first deployed extreme position (shown in broken line), their free ends block the intake lip 3 at the respective outer and inner ends of a rear wall 14, of an air injection duct 15, being flush with the wall, and that in a second collapsed extreme position (shown in solid line), they form a forward wall 16 of the now exposed air injection duct 15 via flap rear wall sections, said duct 15 issuing at a tangent into the intake air duct with the lip geometry internally narrowing radially. The radial, tangential air injection flow occurring with the injection flaps 12, 13 open is illustrated in FIG. 9 by the direction of arrow L4.

Also, the air injection flaps 12, 13 are arranged for automatic pivotal movement in response to the pressure difference prevailing between the static pressure (PZ) on the outside and the static pressure (PX) on the inside of the lip area or areas affected.

Also, the air injection flaps 12, 13 are spring-loaded in the frontal region of the intake lip 3 via, e.g., torsion rods 17, 18, and are arranged to permit their pivotal movement about axes of rotation extending transversely to the engine or nacelle centerline "A".

Whereas in FIG. 8, e.g., said inner and outer flaps 4 and 5 (blowoff L2) are spaced in immediate succession (adjacent one another) in the sector US, the inner and outer flaps 4, 5 of FIG. 9 are equally spaced in a larger circumferential sector US1.

Considering that air injection flaps 12, 13 (FIG. 9) have already been arranged between a pair of inner and outer flaps 4, 5 on an upper portion of the intake lip 3, this will reduce the maximum diameter Dmax. in the upper portion of the intake lip 3 to still further reduce the weight and the friction and form drag of the nacelle.

The arrangement just described, in combination with air injection flaps 12, 13 in immediately successive arrangement (FIG. 9) located on a predominantly lower portion of the intake lip 3 and on a residual circumferential sector US2 of the intake lip 3 not occupied by the inner and outer flaps 4, 5, will on balance produce the smallest maximum nacelle diameter Dmax. (contour K1 in FIG. 9).

The use of additional air injection flaps 12, 13 makes for a substantially smaller contraction ratio D1 (leading edge) / D2 (throat) in accordance with contours K2, K3 (FIG. 9) over the entire circumference.

Since in accordance with FIG. 9, the majority of air injection flaps 12, 13 are maximally closely spaced on the lower portion of the intake lip 3 when viewed from the transverse center, the risk of local flow separations (FIG. 3) on the inside of the intake lip at relatively wide angles of attack in the take-off phase is effectively eliminated. The "thinned" distribution of the air injection flaps 12, 13 on the upper portion of the intake lip 3 in agreement with the disposition of the blowoff flaps 4, 5 is sufficient for the reason that the only critical case that conceivably still needs covering is that of "ground/-standstill" at =0.

Owing to the different shapes of the inner and outer flaps 4, 5 on the one side (FIG. 5) and of the air injection flaps 12, 13 on the forward side (FIG. 6), but also owing to the respectively different shapes of rear wall (10 in FIG. 5) or (14 in FIG. 6), it will be helpful to arrange the blowoff flaps 4, 5 (FIG. 9) always between the injection flaps 12, 13 on the intake lip 3.

The respective blowoff ducts 6 (FIG. 5) and injection ducts 15 (FIG. 6) are associated with the partition walls laterally confining the latter in the intake lip 3.

An object of the present invention targets subsonic long-, medium- or short-haul aircraft, and is suitable for accordingly designed multi-spool, multiflow engines with ducted blowers or ducted propfans of large diameter.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Jet engine nacelle construction comprising a jet engine nacelle having annular entry lip means surrounding a nacelle centerline and serving to guide air into a jet engine,
a plurality of pairs of first and second blowoff flaps movably mounted to the entry lip means for movement between a closed position with the first blowoff flap aligned with adjacent radially outer wall portions of the entry lip means and the second blowoff flap aligned with the adjacent radially inner wall portion of the entry lip means and an air blowoff position with the first and second blowoff flaps defining at least a portion of a radially outwardly extending air blowoff passage through the entry lip means,
and a plurality of pairs of first and second injection flaps manually mounted to the entry lip means for movement between a closed position with the first injection flap aligned with adjacent radially outer wall portions of the entry lip means and the second injection flap aligned with adjacent radially inner wall portion of the entry lip means and an air injection position with the first and second injection flaps bordering at least a portion of a radially inwardly extending air injection passage through the entry lip means,
wherein said pairs of blowoff and injection flaps are alternately arranged over at least a portion of the circumference of the entry lip means.

2. A jet engine nacelle construction according to claim 1, comprising air pressure responsive blowoff flap control means for automatically moving the blowoff flaps between the closed and blowoff positions as a function of the difference in the static pressure on the outside and the static pressure on the inside of the blowoff flap surfaces.

3. A jet engine nacelle construction according to claim 1, wherein the blowoff flaps are arranged for pivotal movement of their free ends relative to a stationary rear wall of an air blowoff duct through the entry lip means, wherein said rear wall extends with respect to the nacelle centerline in an inclined or curved path from a forward radially inner position to a rear radially outer position.

4. A jet engine nacelle construction according to claim 3, wherein the first and second blowoff flaps are arranged on the front end of the entry lip means for joint pivotal movement, said pair of blowoff flaps being deployed in the closed position with free flap ends blocking the entry lip means at respective outer and inner ends of the rear wall and being flush with the adjacent wall portions, said pair of blowoff flaps being deployed in the blowoff position to form a front wall of the exposed air blowoff duct with the outer first blowoff flap forming the radial expansion.

5. A jet engine nacelle construction according to claim 4, wherein the first and second blowoff flaps each exhibit bilaterally differently curved wall sections.

6. A jet engine nacelle construction according to claim 5, wherein the forward wall of the blowoff duct formed by the pair of first and second blowoff flaps in the collapsed blowoff position is inclined or curved in approximate adaptation to the rear wall, more particularly in combination with the inclination of the rear wall such that the air blowoff duct tapers continuously in the direction of flow.

7. A jet engine nacelle construction according to claim 1, wherein a plurality of pairs of said first and second blowoff flaps are provided which are disposed in a uniform pattern over an upper circumferential sector of the entry lip means.

8. A jet engine nacelle construction according to claim 2, wherein a plurality of pairs of said first and second blowoff flaps are provided which are disposed in a uniform pattern over an upper circumferential sector of the entry lip means.

9. A jet engine nacelle construction according to claim 5, comprising air pressure responsive blowoff flap control means for automatically moving the blowoff flaps between the closed and blowoff positions as a function of the difference in the static pressure on the outside and the static pressure on the inside of the blowoff flap surfaces.

10. A jet engine nacelle construction according to claim 1, wherein the air injection flaps are arranged in an annular space between pairs of first and second blowoff flaps.

11. A jet engine nacelle construction according to claim 10, wherein the air injection flaps are each arranged between a pair of first and second flaps and also on an essentially radially inward circumferential sector of the intake lip means.

12. A jet engine nacelle construction according to claim 11, wherein a plurality of pairs of said first and second blowoff flaps are provided which are disposed in a uniform pattern over an upper circumferential sector of the entry lip means.

13. A jet engine nacelle construction according to claim 12, wherein the air injection flaps are arranged in direct succession on a remaining circumferential sector of the intake lip means that is not occupied by the blow-off flaps.

14. A jet engine nacelle construction according to claim 13, wherein the air injection flaps are arranged for automatic pivotal movement in response to the pressure difference between the static pressure prevailing on the inside of the lip means area or areas affected.

15. A jet engine nacelle construction according to claim 2, wherein the air injection flaps are arranged for automatic pivotal movement in response to the pressure difference between the static pressure prevailing on the outside and the static pressure prevailing on the inside of the lip means area or areas affected.

16. A jet engine nacelle construction according to claim 1, wherein the air injection flaps comprise pairs of double flaps of different lengths, the pair being pivotally arranged on the front side of the intake lip means such that in the first extreme position their free ends block the intake lip means at the respective outer and inner end of a rear wall of an air injection duct and extend flush with the wall and such that in the second collapsed extreme position they form a forward wall of the now exposed air injection duct via rear flap wall sections, said air injection duct causing radially inner expansion of the lip geometry and issues tangentially into the intake air flow.

17. A jet engine nacelle construction according to claim 1, wherein a plurality of pairs of said blowoff flaps are disposed in a symmetrical pattern over an upper semicylindrical sector portion of the circumference of the entry lip means, wherein a plurality of pairs of said injection flaps are disposed radially inwardly and between the pairs of blowoff flaps.

18. A jet engine nacelle construction according to claim 17, further comprising a plurality of pairs of said injection flaps disposed along the lower semicylindrical portion sector of the circumference of the entry lip means, said injection flap pairs of the lower sector being spaced closer to one another than the injection flap pairs of the upper semicylindrical sector.

19. A jet engine nacelle construction according to claim 1, wherein a plurality of both the pairs of blowoff and injection flaps are arranged at an upper circumferential sector of the entry lip means, and wherein at a lower circumferential sector of the entry lip means, only a plurality of pairs of said injection flaps are provided, whereby the upper circumferential sector includes alternating injection and blowoff passages and the lower circumference sector includes only injection passages.

20. A jet engine nacelle construction according to claim 1, wherein the first and second blowoff flaps of each pair are pivotally mounted at their front ends to the entry lip means, said blowoff passage being bounded on the forward side by the first and second blowoff flaps folded against one another and on the rearward side by a fixed curved wall extending radially through the entry lip means.

21. A jet engine nacelle construction according to claim 1, wherein the first and second injection flaps of each pair are pivotally mounted at their front ends to the entry lip means, said injector passage being founded on the forward side by the first and second injection flaps folded against one another and on the rearward side by a fixed curved wall extending radially through the entry lip means.

22. A jet engine nacelle construction according to claim 20, wherein the first and second injection flaps of each pair are pivotally mounted at their front ends to the entry lip means, said injector passage being founded on the forward side by the first and second injection flaps folded against one another and on the rearward side by a fixed curved wall extending radially through the entry lip means.

23. A jet engine nacelle construction according to claim 22, wherein a plurality of both the pairs of blowoff and injection flaps are arranged at an upper circumferential sector of the entry lip means, and wherein at a lower circumferential sector of the entry lip means, only a plurality of pairs of said injection flaps are provided, whereby the upper circumferential sector includes alternating injection and blowoff passage and the lower circumference sector includes only injection passages.

24. A jet engine nacelle construction according to claim 1, wherein all said flaps have curved surfaces which merge with the surfaces of the entry lip means to form a continuous streamlined profile when said passages are closed.

25. A jet engine nacelle construction according to claim 22, wherein all said flaps have curved surfaces which merge with the surfaces of the entry lip means to form a continuous streamlined profile when said passages are closed.

26. A jet engine nacelle construction according to claim 10, wherein the air injection flaps are each arranged between a pair of first and second flaps and also on an essentially radially inward circumferential sector of the intake lip means.

27. A jet engine nacelle construction according to claim 26, wherein a plurality of pairs of said first and second blowoff flaps are provided which are disposed in a uniform pattern over an upper circumferential sector of the entry lip means.

28. A jet engine nacelle construction according to claim 27, wherein the air injection flaps are arranged in direct succession on a remaining circumferential section of the intake lip means that is not occupied by the blow-off flaps.

29. A jet engine nacelle construction according to claim 28, wherein the air injection flaps are arranged for automatic pivotal movement in response to the pressure difference between the static pressure prevailing on the inside of the lip means area or areas affected.

30. Jet engine nacelle construction comprising:
a jet engine nacelle having annular entry lip means surrounding a nacelle centerline and serving to guide air into a jet engine,
and air flow control flap means arranged at the entry lip means and movable between a first extreme position adapted to a cruise-flight geometry of the lip means and a second extreme position effectively expanding the radial thickness of the annular lip means while simultaneously providing air flow duct means through the lip means and exiting at the rear of the flap means tangentially to adjacent portions of the entry lip means,
wherein the flap means includes at least one pair of first and second injection flaps pivotally mounted to the entry lip means at their respective forward ends, wherein said first injection flap has an outer surface which is aligned with adjacent radially outer wall portions of the entry lip means when in a first extreme position, and wherein said second injection flap has an inner surface which is aligned with adjacent radially inner wall portions of the entry lip means when in said first extreme position, wherein the air injection flaps are arranged in an annular space between a pair of inner and outer blowoff flaps.

31. Jet engine nacelle construction comprising:

a jet engine nacelle having annular entry lip means surrounding a nacelle centerline and serving to guide air into a jet engine, and air flow control flap means arranged at the entry lip means and movable between a first extreme position adapted to a cruise-flight geometry of the lip means and a second extreme position effectively expanding the radial thickness of the annular lip means while simultaneously providing air flow duct means through the lip means and exiting at the rear of the flap means tangentially to adjacent portions of the entry lip means, wherein the flap means includes at least one pair of first and second injection flaps pivotally mounted to the entry lip means at their respective forward ends, wherein said first injection flap has an outer surface which is aligned with adjacent radially outer wall portions of the entry lip means when in a first extreme position, and wherein said second injection flap has an inner surface which is aligned with adjacent radially inner wall portions of the entry lip means when in said first extreme position, wherein a plurality of pairs of said blowoff flaps are disposed in a symmetrical pattern over an upper semicylindrical sector portion of the circumference of the entry lip means, wherein a plurality of pairs of said injection flaps are disposed radially inwardly and between the pairs of blowoff flaps.

32. A jet engine nacelle construction according to claim 31, further comprising a plurality of pairs of said injection flaps disposed along the lower semicylindrical portion sector of the circumference of the entry lip means, said injection flap pairs of the lower sector being spaced closer to one another than the injection flap pairs of the upper semicylindrical sector.

* * * * *